United States Patent [19]

Lay

[11] 4,240,394
[45] Dec. 23, 1980

[54] ROTARY ENGINE

[76] Inventor: Joachim E. Lay, 1749 Ridgewood, East Lansing, Mich. 48823

[21] Appl. No.: 949,196

[22] Filed: Oct. 6, 1978

[51] Int. Cl.$^3$ .................... F02B 53/06; F02B 53/08
[52] U.S. Cl. .................................. 123/214; 123/220; 123/237
[58] Field of Search ............ 418/61 R, 248; 123/214, 123/237, 244, 248, 220

[56] References Cited

U.S. PATENT DOCUMENTS

| | | | |
|---|---|---|---|
| 607,373 | 7/1898 | Holmes | 418/248 X |
| 3,902,464 | 9/1975 | Lay | 418/260 X |

FOREIGN PATENT DOCUMENTS

| | | | |
|---|---|---|---|
| 985397 | 3/1951 | France | 123/237 |
| 544261 | 11/1955 | Italy | 123/204 |
| 1025993 | 4/1966 | United Kingdom | 123/237 |

*Primary Examiner*—Michael Koczo
*Attorney, Agent, or Firm*—Ian C. McLeod

[57] ABSTRACT

A rotary engine with rotary tubular valves for gas inlet and for gas outlet is described. The engine is of the type wherein at least one rotor is eccentrically rotated on a shaft in a housing with variable volume compartments between the rotor and housing. The rotary tubular valves are spaced around and through the housing with the tube axes parallel to the longitudinal axis of the shaft which mounts the rotor and are parallel to each other. The valve tubes are slotted as is the housing leading into the compartments such that in the proper sequence a power providing gas is introduced through the inlet valves into a compartment to provide a movement of the rotor, and then is exhausted through the outlet valves by the rotor. Preferably there are at least two spaced apart cylindrically shaped rotors eccentrically mounted on a single shaft in separate closed housings and the compartments provided by sliding abutments around each rotor and housing. The engine is particularly adapted for use as an external combustion engine, although it can be operated as an internal combustion engine. The engine can also be operated in reverse as a fluid pump by powering the shaft.

8 Claims, 27 Drawing Figures

ROTARY ENGINE

BACKGROUND OF THE INVENTION

1. Field of the Invention

The present invention relates to rotary engines including a rotor driving a shaft. In particular, the present invention relates to a rotary engine with multiple rotary tubular valves for introducing a power providing fluid into the engine and for outlet of exhausted fluid from multiple variable volume compartments formed by the rotor and engine housing and wherein the tubular valves are driven by fixed radial position rotatable gearing from the shaft.

2. Prior Art

In my U.S. Pat. No. 3,902,464, I described a rotary internal combustion engine having dual, eccentric cylindrically shaped rotors mounted on a shaft in closed housings such that the radius of maximum eccentricity from the shaft of one rotor was 180° around the shaft from the other rotor. Sliding abutments were provided to form variable volume compartments in an Otto cycle engine. A special valving system with cams between the housings was described for inletting the combustible gas mixture into each compartment and for removing the exhaust gases. Conventional flat head or poppet valves were used. The engine provided an especially useful design; however, internal combustion rotary engines in general tend to be difficult and expensive to pollution control so as to meet environmental standards.

External combustion rotary engines are known to generate fewer pollutants. In these engines a fuel is burned in a furnace to provide a heated gas. The heated gas is used directly or the heat is exchanged to a second gas and the gas is provided under pressure to the engine to turn the rotor. Such engines can be steam-water (Rankin cycle) engines or constant temperature (Stirling cycle) engines. These engines and other engines are described in Scientific American Volume 239, No. 1 (July 1978) pages 39 to 49. In external combustion engines, the conventional poppet valves are less suitable since they do not provide effective sealing where there is a high pressure gas being supplied to (rather than in) the rotor compartments.

The use of rotary tubular inlet valves for engines is known, such as the valve described in U.S. Pat. No. 3,535,059 to Kalkbrenner. A curtain valve is used for the outlet of steam in the Kalkbrenner engine which also has only a single variable volume compartment per rotor. The engine is described as being suitable for miniaturization.

The particular problem solved herein was to develop an external combustion rotary engine which was simple and reliable and yet which would function as an external combustion engine to power multiple variable volume compartments. It was also necessary to develop an external combustion rotary engine which had a built-in compressor for pressurizing a gas and to provide heat regeneration wherein waste heat from the exhaust gas is transferred to the inlet gas.

SUMMARY OF THE INVENTION

Objects

It is therefore an object of the present invention to provide a rotary engine with rotary valves for both the inlet fluid and the outlet fluid which overcomes the problems with poppet type valves. It is further an object of the present invention to provide an engine which has a compressor-regenerator and wherein the engine can be operated as a Stirling cycle or Rankin cycle engine. Further still it is an object of the present invention to provide a rotary engine which can be operated as an internal or an external combustion engine or as a pump. Further, it is an object of the present invention to provide a rotary engine which is simple and thus economical to construct. These and other objects will become increasingly apparent from the following description and the drawings.

GENERAL DESCRIPTION

The present invention comprises an improvement in a rotary engine including a shaft mounting at least one eccentric rotor on a longitudinal axis in a closed housing such that a fluid is provided in variable volume compartments between the rotor and the housing as the rotor rotates on the axis which comprises: two separate sets of fixed radial position rotatable gears mounted radially around the shaft, wherein in each set a central gear and an outer ring gear is drivable by an inner gear which is drivable by the central gear; and at least one rotary inlet tube and oulet tube each having a longitudinal axis mounted on the housing around the rotor parallel to the longitudinal axis of the shaft with openings in the tubes for supplying fluid to the compartments, wherein the outer ring gears are mounted around the inlet and outlet tubes to rotate the tubes leading into corresponding openings in the housing such that in operation periodically each compartment is provided with a fluid through the inlet tube, the rotor is rotated by the fluid and then the fluid is exhausted through the outlet tube.

In particular the present invention relates to the improvement in an external combustion engine operable by heating a gas and providing the heated gas under pressure to a rotary engine so as to produce rotation of a shaft, and then exhausting the gas from the rotary engine which comprises: a shaft having a longitudinal axis and with spaced apart bearing surfaces for journaled rotation of the shaft between two spaced apart sections of the shaft; two spaced apart identically shaped rotors eccentrically mounted on the spaced apart sections of the shaft each having a radius of maximum eccentricity from the longitudinal axis of the shaft such that the radius of maximum eccentricity of one rotor is 180° around the shaft from the same radius of the other rotor; closed housings supporting the shaft mounted around the rotors each with a cylindrically shaped inner surface spaced from the radius of maximum eccentricity of a rotor; at least two resiliently mounted sliding abutments on each of the housings for continuous slidable and sealed contact with the rotors or on the rotors for slidable and sealed engagement with the inner surface of the housing through 360° of revolution of the shaft so as to form sealed variable volume compartments between the rotors and housings; multiple valved conduit means for gas inlet and for gas outlet into each of the compartments, wherein during operation of the engine the heated pressurized gas is provided in the compartments through the inlet conduits to rotate the rotor and shaft through preferably about 90° (or any fraction of 180°) of rotation and is then exhausted through the outlet conduit and wherein adjacent compartments of the rotors alternate in being powered by the heated gas; and a rotary gas compressor for the cool gas mounted on the shaft including a compressor rotor eccentrically mounted on the shaft and a closed compressor housing with sliding abutments mounted radially on the rotor to slidably and sealably engage an inner wall of the housing or mounted on the housing to slidably and sealably engage the rotor to form variable volume compressor compartments.

The word "engine" is used herein in the broadest sense to mean a machine wherein physical power is used to produce a desired physical effect and particularly includes pumps and combustion engines.

SPECIFIC DESCRIPTION

The present invention is particularly concerned with an external combustion, dual rotor engine which has a rotary compressor driven from the same shaft as the engine rotors and with a regenerator as part of the compressor section of the engine.

The engine shown in my U.S. Pat. No. 3,902,464 can be adapted with the rotary compressor-regenerator on the shaft as shown particularly in FIG. 1 and used as an external combustion engine; however, as previously indicated, standard poppet valves do not function well in an external combustion engine, since they are designed to seat firmly upon internal combustion of an ignitable gas in a variable volume chamber. Thus the preferred rotary valve rotary engine of FIGS. 1 to 10 was discovered.

Figure 1:
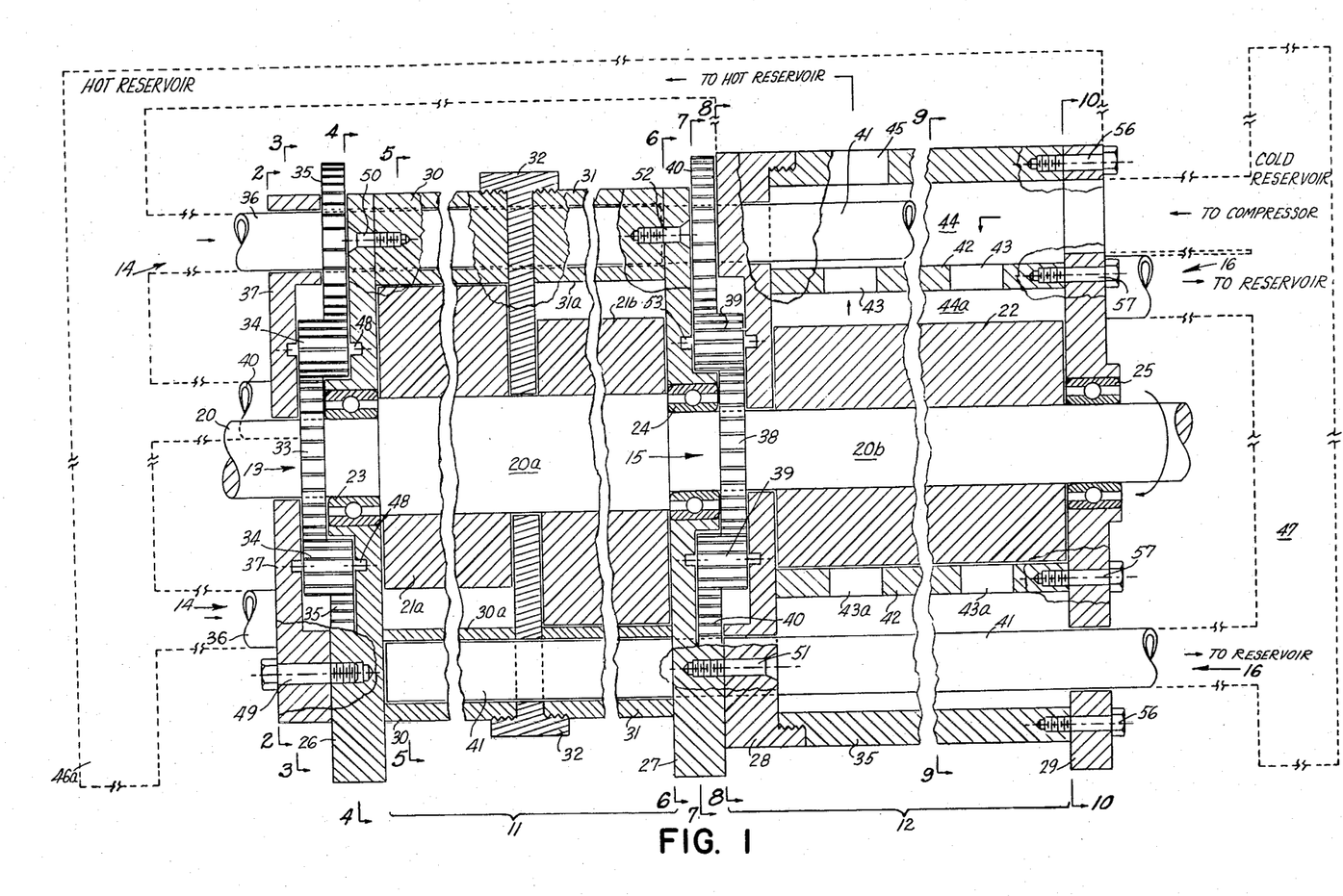
FIG. 1 is a front partial cross-sectional view of the rotary engine and of the compressor, particularly illustrating dual rotors eccentrically mounted on a shaft in dual closed housings; rotary tubular valves and fixed radial position rotatable gears for rotating multiple tubular valves; and a compressor rotor mounted on the shaft in a closed compressor housing.

Referring to FIG. 1, an external combustion engine with a rotary variable volume engine section 11 and a gas compression section 12 are shown in cross-section. FIG. 1 includes only reference numbers less than 100 for ease of reference. FIGS. 2 to 10 show the details of the construction of the engine of FIG. 1.

Fixed radial position rotatable gears 13 operate a multiple tubular rotary inlet valve system 14 and fixed radial position rotatable gears 15 operate a multiple tubular rotary outlet valve system 16. A shaft 20 having sections 20a supports dual rotors 21a and 21b and section 20b supports compressor rotor 22. The shaft 20 is journaled in the engine section 11 on roller bearings 23 and 24 and in the compressor section 12 on another roller bearing 25. The bearings 23 and 24 are held in place on end plates 26 and 27 on the rotary engine section 11 and one end plate 29 in the compressor section 12. The end plates 26 and 27 are mounted on cylindrically cross-sectioned housings 30 and 31 containing the rotors 21a and 21b respectively and separated and held together by a plate 32. The housings 30 and 31 have inner cylindrical surfaces 30a and 31a.

The inlet valve system 14 operated by the fixed radial position rotatable gears 13 includes a central gear 33 rotating radially mounted satellite gear sets 34 and 35. The gears 35 are mounted in a ring around the outside of inlet valve tubes 36 and are driven by gears 34 which are mounted between the end plate 26 and cover 37 so that the gears 33, 34 and 35 are journaled for rotation.

The outlet valve system 16 is rotated by the fixed radial position rotatable gears 15 including a central gear 38 which via intermediate or pilot gear sets 39 rotates ring gears 40 around the outside of rotary valve tubes 41. The tubes 41 extend from the rotary engine section 11 through the compressor section 12. The outermost gears 35 and 40 rotate on a 1:1 basis with the central gears 33 and 38. The longitudinal axes of rotation of tubes 36 and 41 are parallel to the longitudinal axis of the shaft 20 and to each other and are at an equal distance or radii from the shaft 20.

The compressor section 12 includes a cylindrically cross-sectioned inner compressor housing 42 surrounding and in closely spaced relation to the eccentrically mounted rotor 22 with ports 43 leading into chamber 44. The rotor 22 has a compartment 44a which is variable in volume depending upon the position of the rotor 22. The heated gas exits out port 45.

Figure 11:
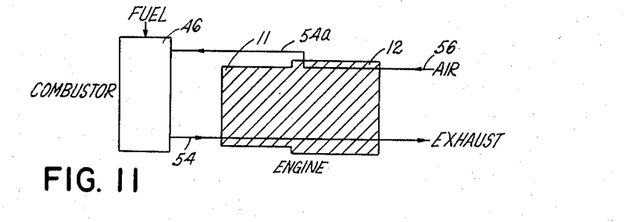
FIG. 11 is a schematic view of the rotary engine, compressor and regenerator of FIGS. 1 to 10 in an operative setting where the heated combustion products power the engine directly in an open cycle.
Figure 12:
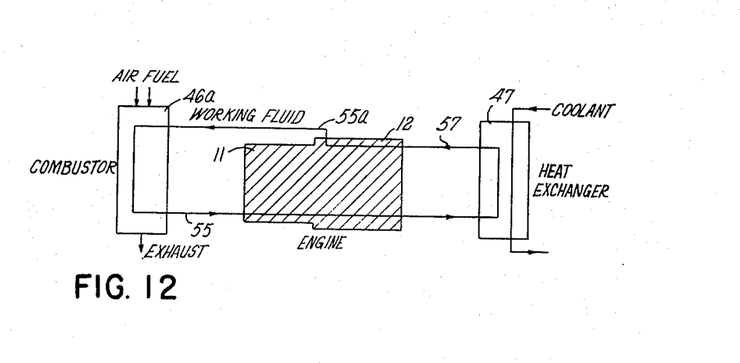
FIG. 12 is a schematic view of the rotary engine, compressor and regenerator of FIGS. 1 to 10 where the combustion products heat a second gas, such as hydrogen, helium or air, which directly powers the engine in a closed cycle.
Figure 13:
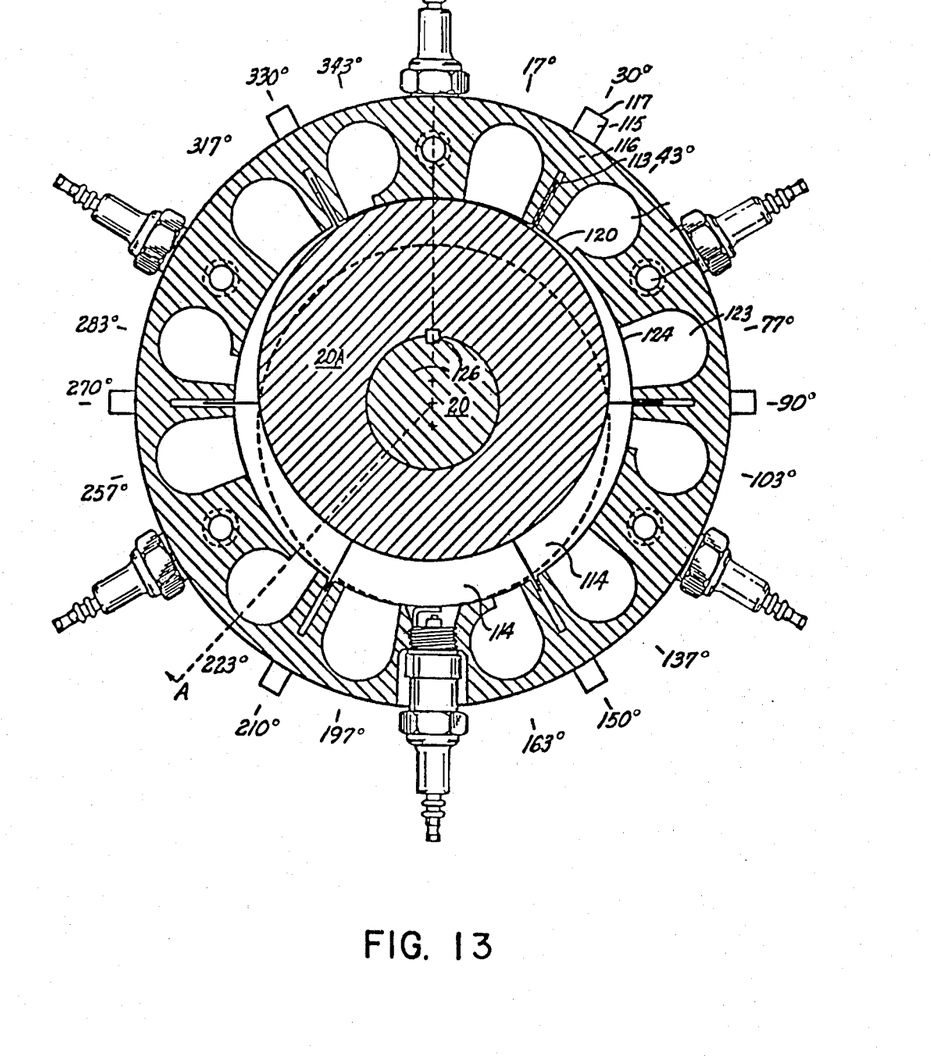
FIG. 13 is a modified version of FIG. 5 showing an internal combustion engine with spark plugs.

FIG. 1 illustrates a hot reservoir 46a and a cold reservoir 47 in broken lines. The hot reservoir 46 or 46a is a conventional external combustion chamber or furnace as shown in FIG. 11 or 12. In FIG. 11 the cold reservoir 47 is the environment and the system is open in relation to the driving gas for the engine 11. In FIG. 12 the system is closed in relation to the driving gas for the engine 11.

Figure 2:
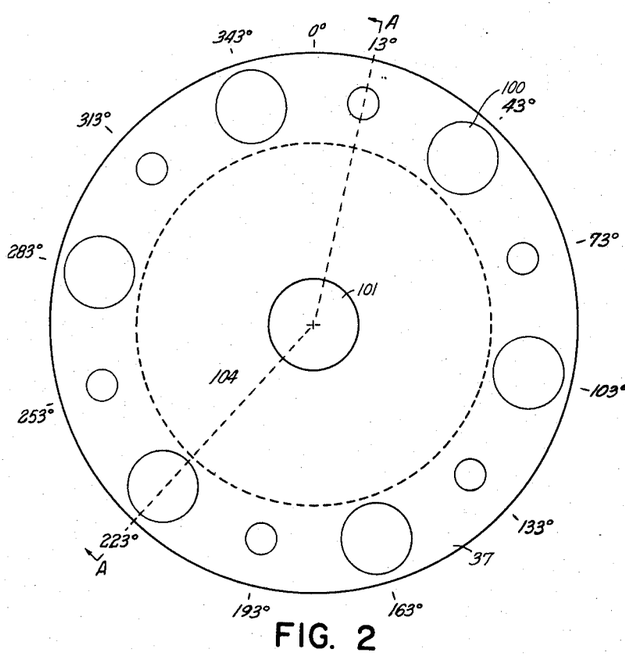
FIG. 2 is an end view along line 2—2 of FIG. 1 particularly showing a cover for journaling the tubular valves and for mounting the fixed radial position rotatable gearing.
Figure 2A:
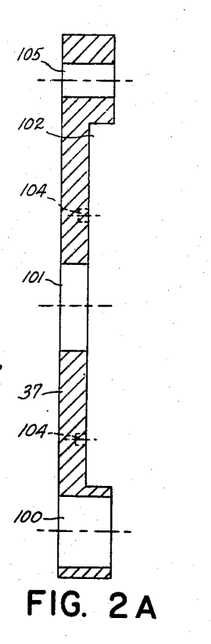
FIG. 2A is a cross-section along line A—A of FIG. 2 showing the end plate alone.

FIGS. 2 and 2A show the detailed construction of the cover 37, wherein holes 100 are provided for journaling rotary inlet valve tubes 36. A central hole 101 is provided for shaft 20. A space 102 is provided for the mounting of the gears 33 and 34. Holes 104 are provided in cover 37 for journaling the shafts 48 which support gears 34 for rotation. Holes 105 are provided for bolts 49 which bolt the cover 37 to the housing 30.

Figure 3:
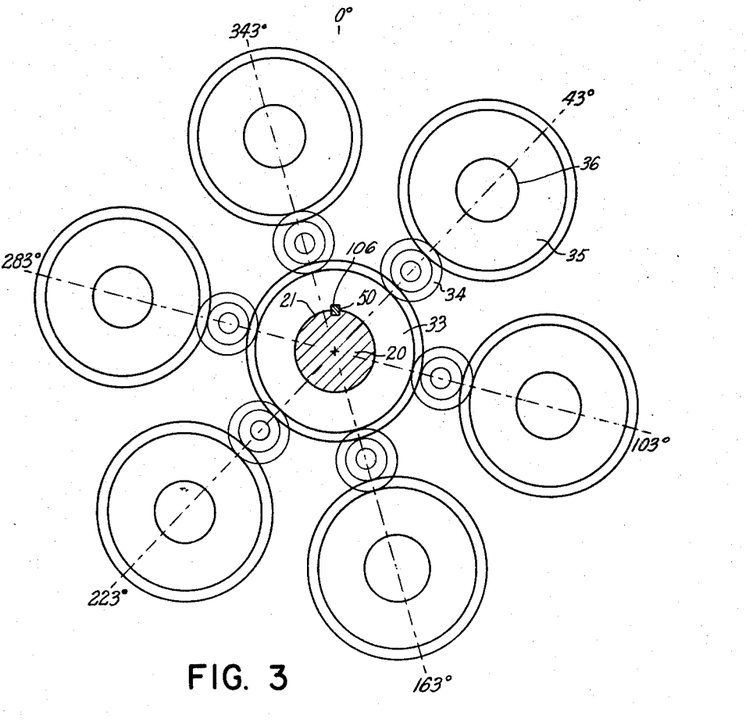
FIG. 3 is an end view along line 3—3 of FIG. 1 without the end plate or cover plate showing the radial positioning of the fixed radial position rotatable gearing for rotating the tubular valves, including a central gear mounted around the shaft for driving pilot gears which in turn drive ring gears around the tubular valves.

FIG. 3 shows the positioning of the fixed radial position rotatable gears 13 and shaft 20 in section 3—3 of FIG. 1. A keyway 106 is provided for mounting the central gear 33 on shaft 20 by means of key 50. Gears 35 are mounted in a ring around the inlet valves 36. The dotted lines across the longitudinal axes of rotation of the gears 33, 34 and 35.

FIGS. 4, 4A, 4B, 4C and 4D show the construction of the end plate 26 for mounting the gears 33, 34 and 35 of FIG. 3. Hole 107 is provided for mounting the bearing 23 and holes 108 for valve tubes 36 in semicircular recesses 109 and 109a which house the gears 34 and 35. Threaded holes 110 are provided for bolts 49. Chamfered holes 111 are provided for tapered head bolts 50. Holes 112 journal shaft 48 of gear 34 along with holes 104 on the cover 37.

Figure 5:
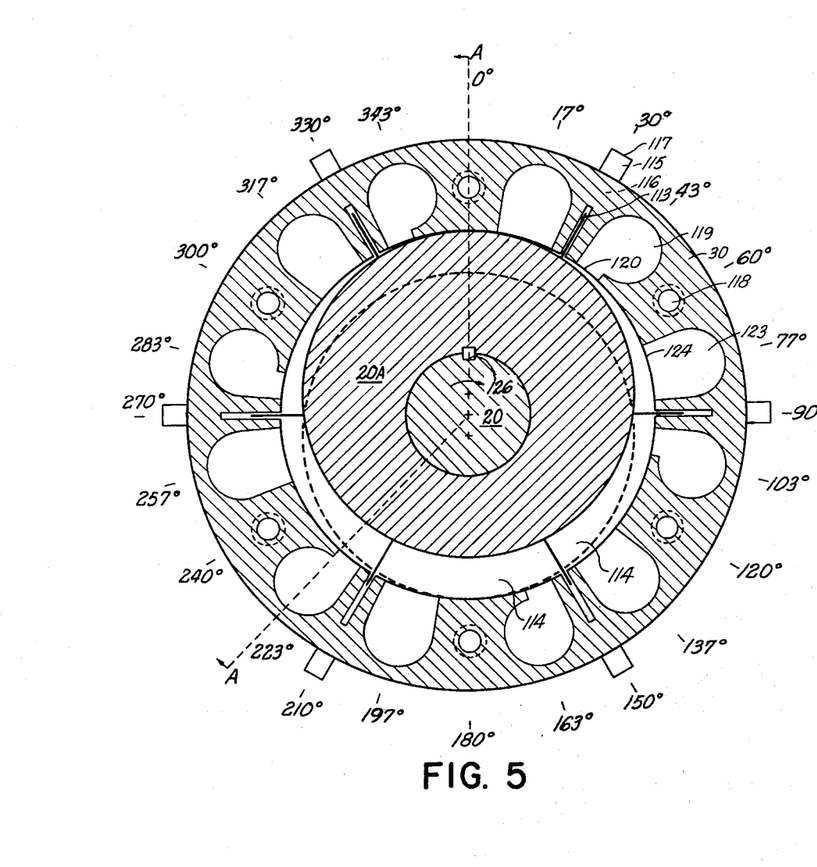
FIG. 5 is an end cross-sectional view along line 5—5 of FIG. 1 showing one rotor and its housing with channels for receiving the tubular inlet and outlet valves (not shown) in the housing and with variable volume compartments formed by sliding abutments in contact with the rotor and mounted on the housing.
Figure 5A:
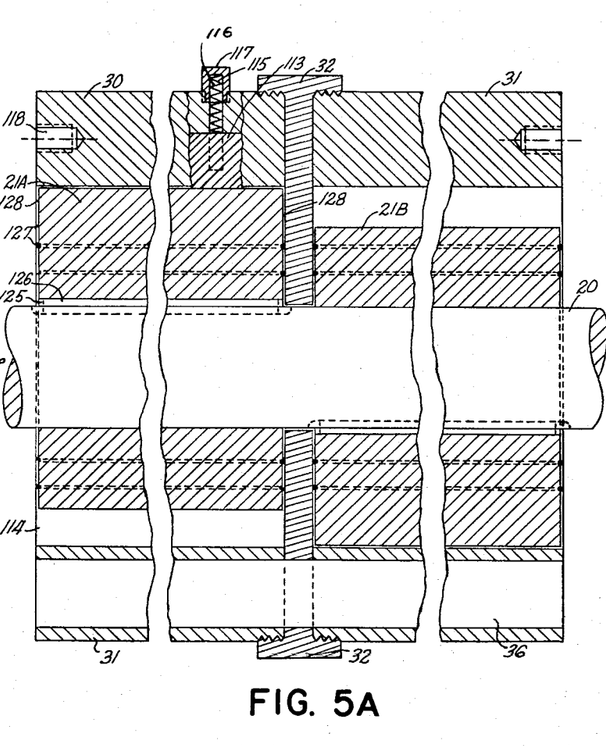
FIG. 5A shows a front cross-sectional view along line A—A of FIG. 5 of only the dual rotors and the housings with one intake valve shown in dotted lines.
Figure 5B:
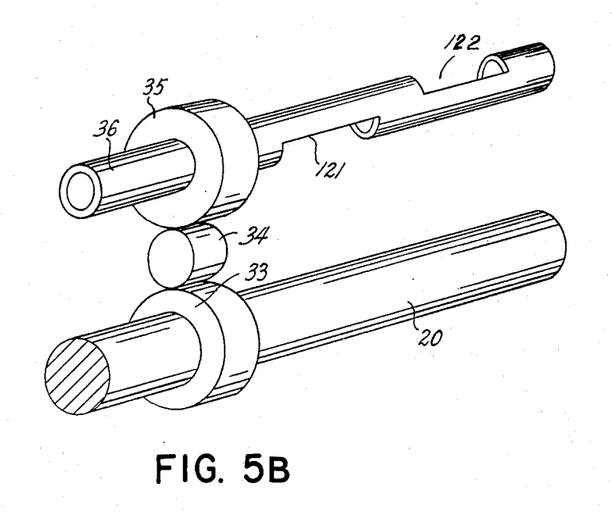
FIG. 5B is an isolated perspective view of the shaft and one tubular valve which has an axis parallel to the axis of the shaft and the fixed radial position rotatable gearing for rotating the valve.
Figures 6, 6D:
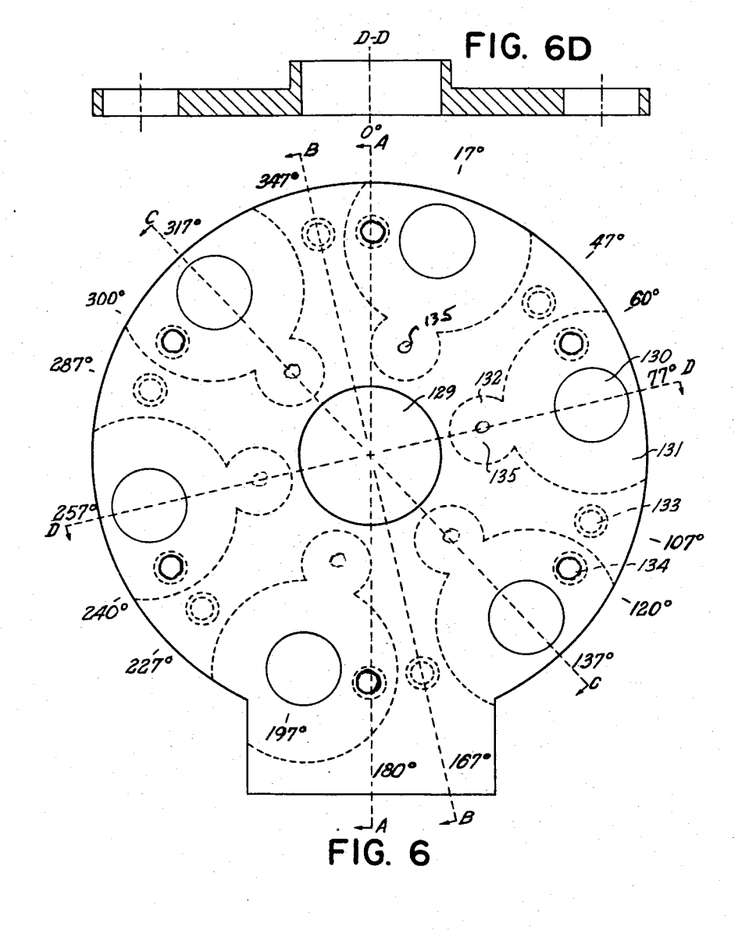
FIG. 6 is an end sectional view along line 6—6 of FIG. 1 showing the second end plate opposite the first end plate for mounting the fixed radial position rotatable gears and journaling the exhaust valves and for closing the second rotor housing.
Figure 6A:
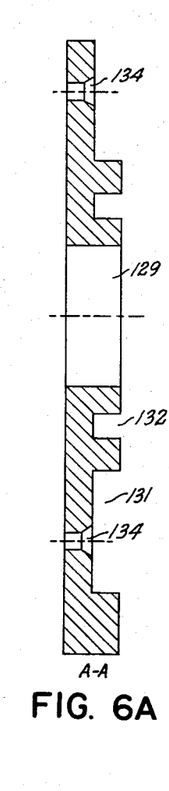
FIGS. 6A, 6B and 6C are front cross-sectional views of the end plates alone along lines A—A, B—B and C—C of FIG. 6.
Figures 6B, 6C:
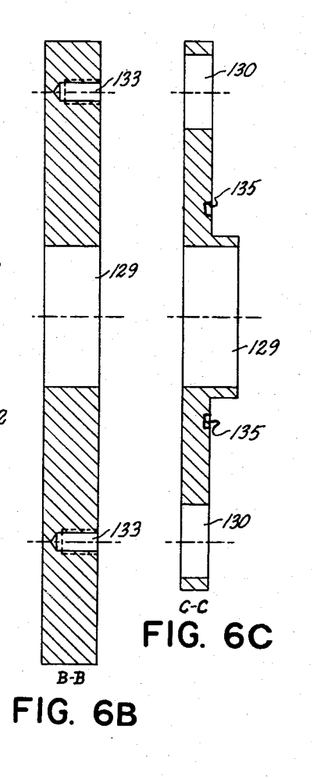

FIGS. 5 and 5A show the details of the slidable abutment plates 113 which divide each rotor 21a and 21b into variable volume compartments 114. Springs 115 are mounted in slots 116 in housing 31 as a resilient means to urge the abutments 113 into sealing and sliding engagement with the rotor 20a. Caps 117 are threaded on the housing 30 to hold the springs 115 in place. Threaded holes 118 are provided in the housing for bolts 50 for holding the end plate 26 in place. Holes 119 are provided for inlet valve tubes 36 with slots 120 extending the length of the housings 30 and 31 leading into the compartments 114. The slots 120 correspond in shape to slots 121 and 122 in the inlet tube 36. The second slot 122 is 180° around the valve tube 36 from the first slot 121. The first slot 121 is adjacent rotor 21a and the second slot 122 is adjacent rotor 21b. Holes 123 are provided in the housing 31 for the exhaust valves 41 and have wider slots 124 corresponding to two similar slots (not shown) in the valves 41 which are 180° apart. A keyway 125 and key 126 hold rotors 21a and 21b in place on shaft 20. Ring seals 127 are provided around each radial face 128 of each rotor 21a and 21b. The construction of rotor 21b and housing 31 is identical to that of rotor 21a and housing 30. FIG. 5B is a perspective view of the radial positioning of one inlet valve tube 36 and gears 33, 34 and 35 in relation to the shaft 20.

Figure 4:
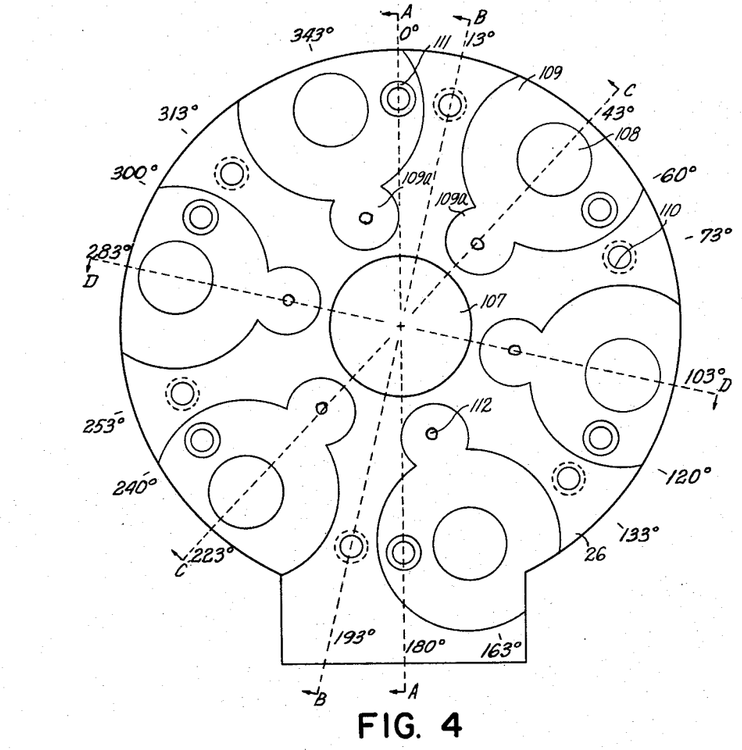
FIG. 4 is an end view along line 4—4 of FIG. 1 showing the end plate for mounting the gears and for providing closure for the housing.
Figure 4A:
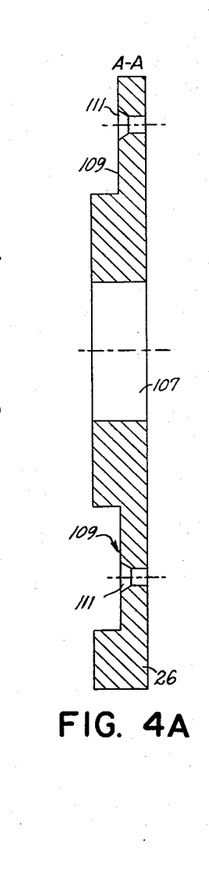
FIGS. 4A, 4B, 4C and 4D show various cross-sections of the plate shown in FIG. 4 alone.
Figure 4B:
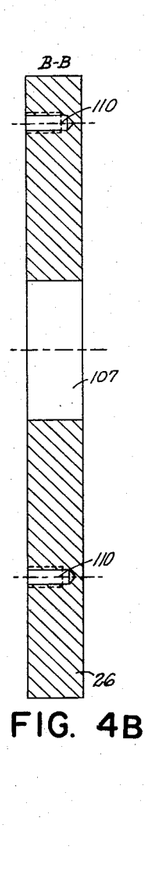
Figure 4C:
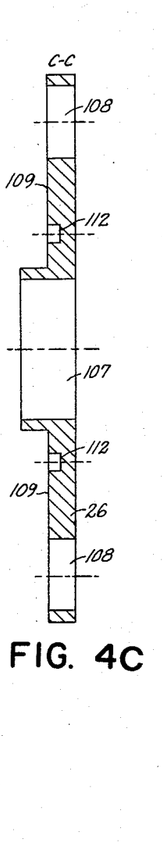
Figure 4D:
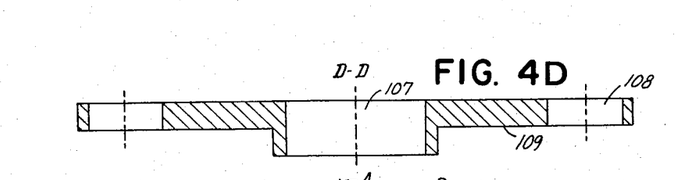

FIGS. 6 and 6A to 6D show the opposite end plate 27 and is substantially similar in construction to the end plate 26 of FIG. 4. Hole 129 is provided which mounts bearing 24 and holes 130 for rotating the exhaust valve tubes 41 are provided in recesses 131 and 132 which house gears 39 and 40. Threaded holes 133 are provided for bolts 51 which hold the end plate 27 on the radial face of the housing 31. Threaded holes 134 are provided for tapered head bolts 52 which hold the end plate 27 and compressor end plate 28 together. Recesses 135 journal shaft 53 of gear 39.

Figure 7:
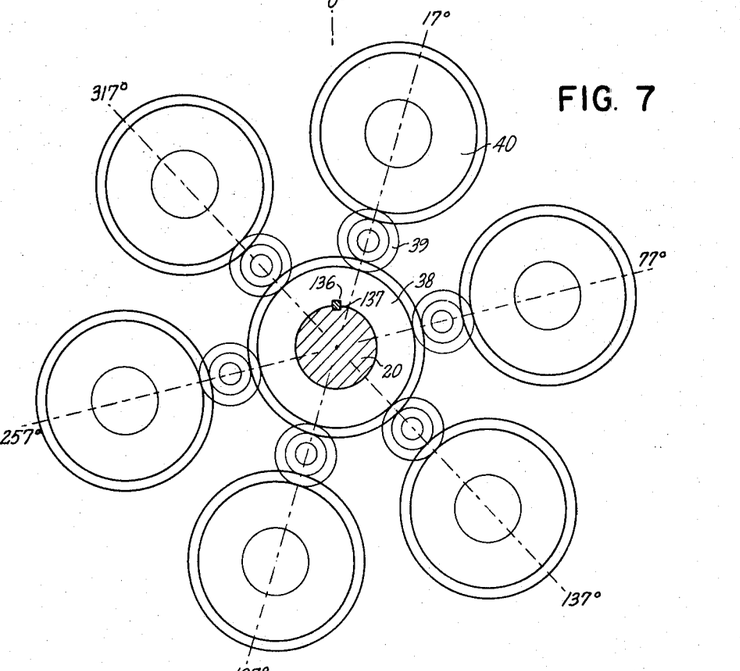
FIG. 7 is an end sectional view along line 7—7 of FIG. 1 without the end plate or cover plate showing the fixed radial position rotatable gears for rotating the tubular exhaust valves.

FIG. 7 shows the fixed radial position rotatable gearing 15 for the exhaust valve system 16 isolated from some of the other elements. A keyway 136 and key 137 is provided for mounting gear 33 on shaft 20. The gears 40 form a ring around valve tubes 41. The dotted lines in FIG. 7 cross the longitudinal axes of rotation of the gears 38, 39 and 40.

Figure 8:
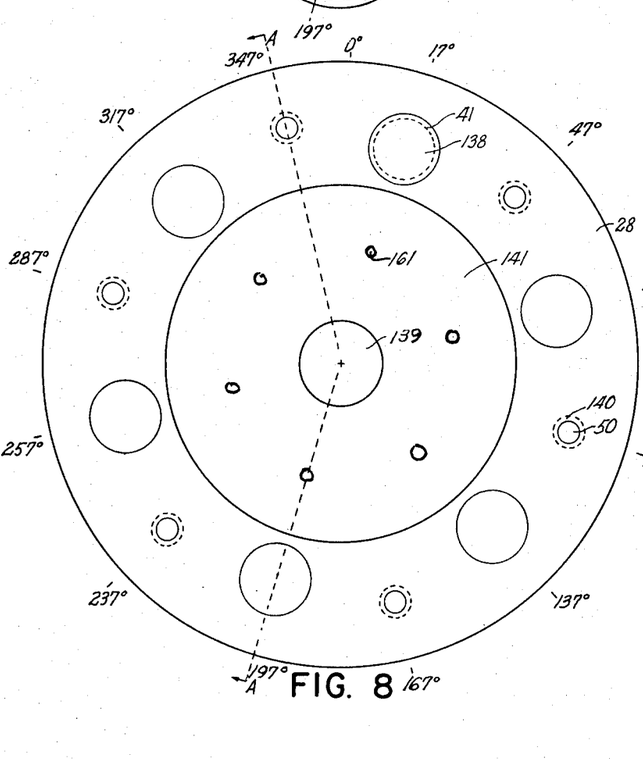
FIG. 8 is an end section view along line 8—8 of FIG. 1 showing the cover plate for journaling the exhaust valves and for closure of the compressor housing.
Figure 8A:
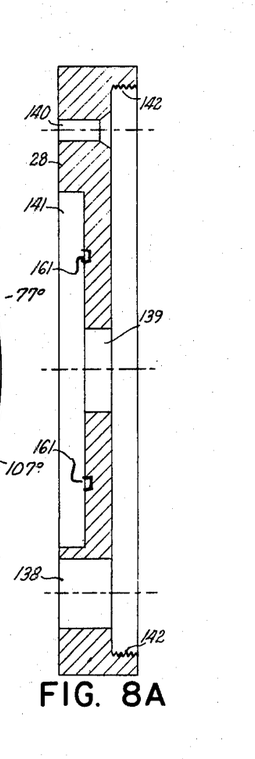
FIG. 8A is a cross-section along line A—A of FIG. 8 showing the cover plate alone.

FIGS. 8 and 8A show the compressor end cover 28 in the compressor section 12 partially isolated from the other elements. Peripheral holes 138 are provided for exhaust valve tubes 41. The central hole 139 is for shaft 20. Bolts 50 fit in a chamfered hole 140 in the plate 28 for bolting the plate 28 to the plate 27. A circular recess 141 is provided for mounting the gears 38 and 39. Internal threads 142 around the periphery of the cover 28 are provided for mounting the compressor housing 35. Holes 161 are provided for journaling the shafts 53 of gears 39.

Figure 9:
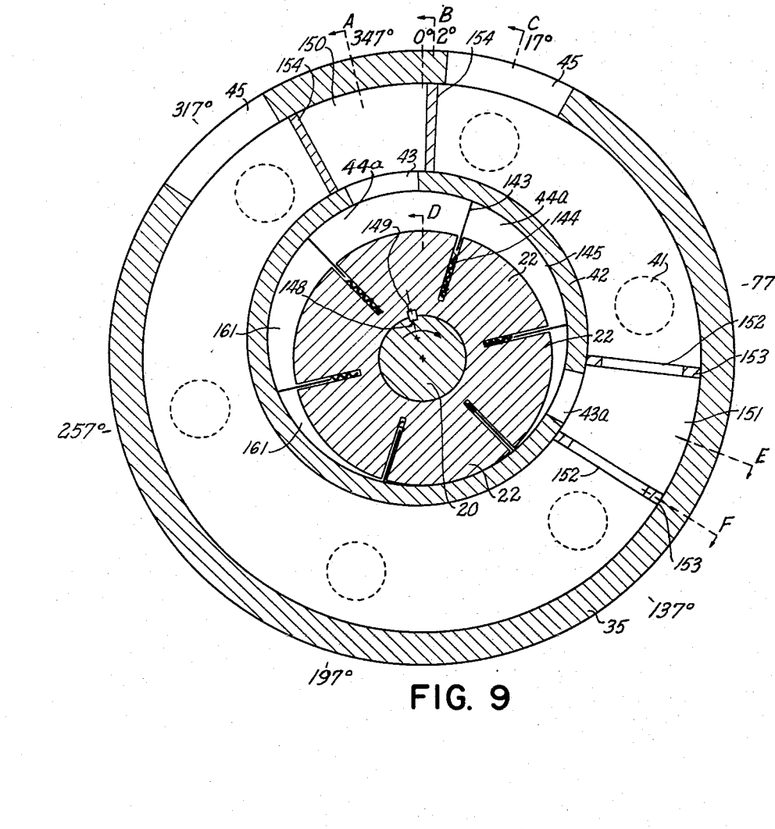
FIG. 9 is an end cross-sectional view along line 9—9 of FIG. 1 showing the compressor rotor, an inner compressor chamber and an outer heat exchange chamber used as a regenerator for heating the compressed gas in contact with the exhaust tubes.
Figure 9A:
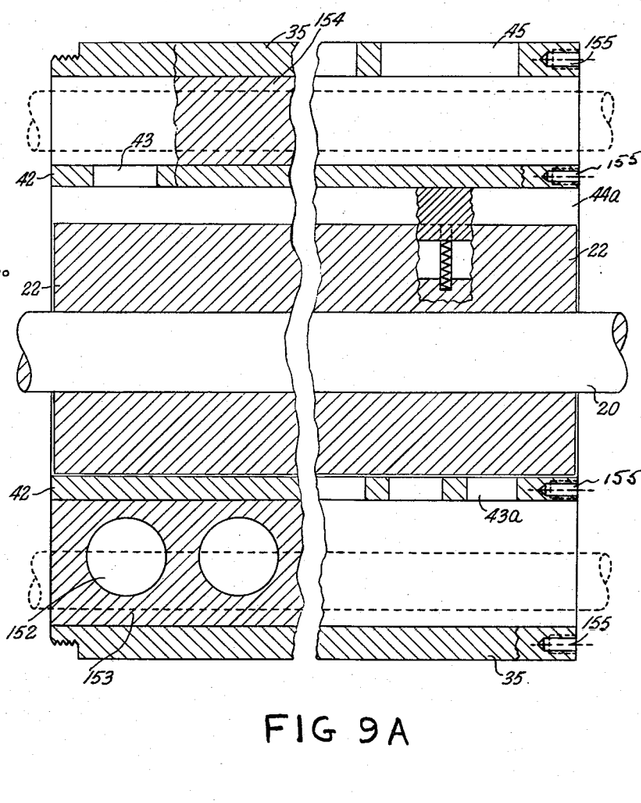
FIG. 9A includes several sections along lines A—A to F—F of FIG. 9 showing the construction of compressor and particularly inlet and exhaust ports from the inner compressor chamber.

FIGS. 9 and 9A show the details of compressor-regenerator section 12. Eccentric rotor 22 is provided mounting abutment plates 143 which are spring 144 loaded to engage the cylindrical wall 145 of compartments 44a which compresses the gas upon rotation. The rotor 22 is held in place on shaft 20 by key 148 is keyway 149. Inlet ports 43 lead to chamber 150 which leads from the cold reservoir 47 (FIGS. 1 and 12) or from the atmosphere (FIG. 11) which inlets gas into the variable volume compartments 44a. The compressed gas exits via port 43a into chamber 151, goes out ports 152, passes around exhaust valve tubes 41 in chamber 44 and out ports 45 which are connected by a conduit 54 or 55 (FIGS. 11 and 12) to the hot reservoir 46 or 46a. The chamber 151 and holes 152 are defined by walls 153 which are mounted between the inner chamber 42 and outer chamber 35. The chamber 150 is defined by walls 154 extending across the chamber 44. Threaded holes 155 are provided for bolts 56 which hold the cover 29 in place adjacent the rotor 22.

Figures 10, 10A:
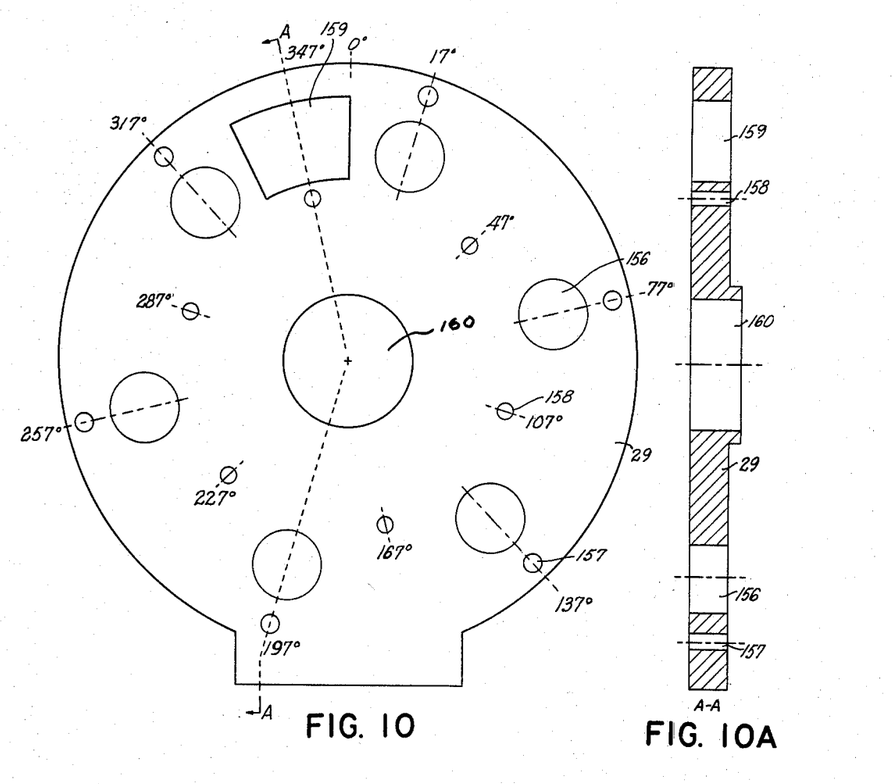
FIG. 10 is an end sectional view along line 10—10 of FIG. 1 showing the compressor cover plate and particularly showing holes for journaling the exhaust valves and an inlet port leading into the compressor section.
FIG. 10A is a front cross-sectional view of the cover plate alone along line A—A of FIG. 10.

FIGS. 10 and 10A show the compressor end plate to close the compressor housing 35. Holes 156 are provided for journaling rotary exhaust valve tubes 41. Holes 157 and 158 are provided for bolts 56 and 57 which hold the cover 29 in place on the radial faces of the inner chamber 42 and of the outer chamber 35. Hole 159 leads into chamber 150 and is for inlet of cool gas via conduit 56 or 57 (FIGS. 11 and 12). Hole 160 is provided for shaft 20.

In operation, the shaft 20 and rotors 21a and 21b are rotated by a heated gas under pressure supplied by burning a fuel in a furnace 46 or 46a. The gas from the combustion is supplied to the engine 11 directly by conduit 54 or used to supply heat by heat exchange to a second gas in a second conduit 55. The gas inlets into the furnace 46 or 46a via conduits 54a or 55a. The heated gas is supplied to rotary inlet valve tubes 36 which are driven by the planetary gears 13. As the tubes 36 rotate, one slot 120 or 121 (FIG. 5B) opens into one variable volume compartment 114 such that the heated gas passes through opening 120 and pushes the rotor 21a or 21b to expand the compartment 114. After the shaft 20 rotates 180° and the gas in each compartment 114 is diminished in volume, the exhaust valve tubes 41 open and gas begins to exhaust through the wide slot 124 in the housing opening 123 and through the valve tube 41. The inlet valve tubes 36 are open for 90° of rotation because of the width of the housing slot 120 in the holes 119 for inlet valves 36. Thus initially and through 90° of rotation in compartment 114, the rotor 21a or 21b is powered by hot gas under pressure while the other opposite rotor 21a or 21b is exhausting gas through an exhaust valve tube 41.

The compressor section 12 is used to compress a gas to be supplied to the furnace 46 or 46a. The cool gas enters via opening 159 (FIG. 10) into chamber 44, inlets through ports 43, is compressed in variable volume compartment 44a and exits via ports 43a. Heat is then transferred from the exhaust valves 41 to the gas and the heated gas exits via port 45 to the furnace 46 or 46a where it is burned or further heated and then fed to inlet valve tubes 36. The compressor rotor 22 rotates through 90°, exhausts the compressed gas in each compartment 44a through the remaining 270° and then recycles to pick up more cool gas. A partial vacuum is created in chambers 161 (FIG. 9) which facilitates the introduction of the cool gas into the chamber 147 adjacent port 43.

The rotary engine can also be operated as an internal combustion engine wherein igniters, such as spark plugs or glow plugs 200 (not shown) are used in the manner of U.S. Pat. No. 3,902,464. This includes a rotary engine using two identically shaped rotors eccentrically mounted on a common shaft in two separate housings with the maximum eccentricity spaced 180° from each other; at least two sliding abutments resiliently mounted in each of the housings for continuous contact with the rotors throughout the revolution of the shaft so as to form sealed compression and then combustion chambers with the rotors; and fuel-air ignition means in each compression combustion chamber, wherein during operation each of the chambers on one of the rotors is providing in sequence a fuel-air mixture through an inlet valved conduit means and then fuel-air compression through 360° of rotation while the other of the rotors is providing in sequence fuel-air combustion and then combustion products exhaust through an exhaust valved conduit means through a second 360° of rotation.

It will also be appreciated that the engine can be operated as a fluid pump by driving the shaft. In this event, the fluid, which can be gaseous or liquid flows through the outlet valves to the inlet valves in a reverse flow pattern. Also a conventional starter can be used as well as lubrication of the valves in the engine using an oil pump driven by the shaft which are not shown.

I claim:

1. In a rotary engine including a shaft mounting at least one eccentric rotor on a longitudinal axis in a closed housing such that a fluid is provided in variable volume compartments between the rotor and the housing formed by multiple sliding abutments mounted around the housing in sealing engagement with the rotor as the rotor rotates on the axis the improvement which comprises:
   (a) two separate sets of fixed radial position rotatable gears mounted around the shaft so that the sets are on opposite ends of the housing, wherein in each set a central gear is provided around the shaft and an outer gear is drivable by an intermediate gear which is drivable by the central gear;
   (b) at least one rotary inlet tube and outlet tube each having a longitudinal axis mounted on the housing around the rotor parallel to the longitudinal axis of the shaft with openings in the tubes for supplying fluid to the compartments, wherein the outer gears are mounted around the inlet tube at one end of the housing and around the outlet tube at the other end of the housing to rotate the tubes with the openings in the tubes leading into corresponding openings in the housing such that in operation periodically each compartment is provided with a fluid through the inlet tube, the rotor is rotated by the fluid and then the fluid is exhausted through the outlet tube; and
   (c) a gas compressor including an eccentric compressor rotor mounted on the shaft in a compressor housing with sliding abutments mounted radially on the rotor which sealably engage an inner wall of the compressor housing to form gas compartments of variable volume as the shaft is rotated wherein the outlet tube extends outside of the compressor housing in a confined space such that the compressed gas is in a heat exchange relationship with the exhausted gas in the outlet tube to provide a regenerator for transferring heat from the exhausted gas.

2. The engine of claim 1 which is adapted with ignition means mounted on the housing leading into the compartments so as to operate as a rotary internal combustion engine and wherein the openings in the tubes and housing are such that a fuel and air mixture is fed into the compartments as a gaseous fluid by the inlet tube, ignited to rotate the rotors by the ignition means and then exhausted through the outlet tube.

3. The engine of claim 1 which is adapted for operation as an external combustion engine including a combustor for burning a fuel externally of the engine to provide the fluid which is supplied by the inlet tube to the engine and wherein the opening in the tube inlets the fluid into the compartments to rotate the rotor which is exhausted through the outlet tube.

4. In a rotary engine including a housing providing for journaling of a rotatable shaft mounted on a longitudinal axis in the housing, two spaced apart cylindrical rotors eccentrically mounted on the shaft each with a radius of maximum eccentricity from the shaft such that the maximum eccentricity of one rotor is 180° around the shaft from the other rotor and multiple sliding abutments mounted around the housing in sealing engagement with each rotor to form multiple variable volume compartments, the improvement which comprises:
   (a) two separate sets of fixed radial position rotatable gears mounted around the shaft so that the sets are on opposite ends of the housing wherein in each set a central gear is mounted around the shaft and outer gears are drivable by intermediate gears which are drivable by the central gear;

(b) multiple rotary inlet tubes and multiple outlet tubes leading into each compartment, each mounted on the housing and having a longitudinal axis parallel to the longitudinal axis of the shaft with openings in the tubes leading into corresponding openings in the housing into the compartments, wherein the outer gears are mounted around the inlet and outlet tubes so as to rotate the openings in the tubes such that in operation periodically each compartment is filled with a gas through the inlet tubes, the rotors are rotated by the gas and then the gas is exhausted through the outlet tubes; and (c) a gas compressor including an eccentric compressor rotor mounted on the shaft in a compressor housing with sliding abutments mounted radially on the rotor which sealably engage an inner wall of the compressor housing to form gas compartments of variable volume as the shaft is rotated wherein the outlet tubes extend around the outside of the compressor housing in a confined space such that the compressed gas is in a heat exchange relationship with the exhausted gas in the outlet tubes to provide a regenerator for transferring heat from the exhausted gas.

5. In an external combustion engine operable by heating a gas and providing the heated gas under pressure to a rotary engine so as to produce rotation of a shaft and then exhausting the gas from the engine, the improvement in the rotary engine which comprises:

(a) a shaft having a longitudinal axis and with spaced apart bearing surfaces for journaled rotation of the shaft between two spaced apart sections of the shaft;

(b) two spaced apart identically shaped rotors eccentrically mounted on the spaced apart sections of the shaft each having a radius of maximum eccentricity from the longitudinal axis of the shaft such that the radius of maximum eccentricity of one rotor is 180° around the shaft from the same radius of the other rotor;

(c) closed housings supporting the shaft mounted around the rotors each with a cylindrically shaped inner surface spaced from the radius of maximum eccentricity of the rotor;

(d) at least two resiliently mounted sliding abutments on each of the housings for continuous slidable and sealed contact with the rotors through 360° of revolution of the shaft so as to form sealed variable volume compartments between the rotors and housings;

(e) two separate sets of fixed radial position rotatable gears mounted radially of the shaft so that the sets are on opposite ends of the housing, wherein in each set a central gear is mounted around the shaft and outer gears are drivable by intermediate gears which are drivable by the central gear;

(f) multiple rotary inlet tubes and multiple outlet tubes leading into each compartment each having a longitudinal axis mounted on the housing around the rotors parallel to the longitudinal axis of the shaft with openings in the tubes leading into corresponding openings in the housing wherein the outer gears are around the tubes and rotate the openings in the tubes such that in operation periodically each rotor compartment is provided with a gas under pressure through the inlet tubes, the rotors are rotated by the gas and then the gas is exhausted through the outlet tubes; and (g) a gas compressor including an eccentric compressor rotor mounted on the shaft in a compressor housing with sliding abutments mounted radially on the rotor which sealably engage an inner wall of the compressor housing to form gas compartments of variable volume as the shaft is rotated wherein the outlet tubes extend around the outside of the compressor housing in a confined space such that the compressed gas is in a heat exchange relationship with the exhausted gas in the outlet tubes to provide a regenerator for transferring heat from the exhausted gas.

6. The rotary engine of claim 5 with a gas compressor including a compressor rotor mounted on the shaft in a compressor housing so as to compress the gas before heating.

7. In an external combustion engine operable by heating a cool gas and providing the heated gas under pressure to a rotary engine so as to produce rotation of a shaft and then exhausting the gas from the rotary engine, the improvement in the rotary engine which comprises:

(a) a shaft having a longitudinal axis and with spaced apart bearing surfaces for journaled rotation of the shaft between two spaced apart sections of the shaft;

(b) two spaced apart identically shaped rotors eccentrically mounted on the spaced apart sections of the shaft each having a radius of maximum eccentricity from the longitudinal axis of the shaft such that the radius of maximum eccentricity of one rotor is 180° around the shaft from the same radius of the other rotor;

(c) closed housings supporting the shaft mounted around the rotors each with a cylindrically shaped inner surface spaced from the radius of maximum eccentricity of the rotor;

(d) at least two resiliently mounted sliding abutments on each of the housings for continuous slidable and sealed contact with the rotors through 360° of revolution of the shaft so as to form sealed variable volume compartments between the rotors and housings;

(e) multiple valved conduit means having a longitudinal axes mounted around the housing parallel to the axis of the shaft for gas inlet and for gas outlet into each of the compartments, wherein during operation of the engine the heated pressurized gas is provided in the compartments through the inlet conduits to rotate the rotor and shaft through a fraction of 180° of rotation and is then exhausted through the outlet conduit and wherein adjacent compartments of the rotors alternate in being powered by the heated gas; and (f) a rotary gas compressor for the cool gas mounted on the shaft including a compressor rotor eccentrically mounted on the shaft and a closed compressor housing with sliding abutments mounted radially on the rotor to slidably and sealably engage an inner wall of the housing to form variable volume compressor compartments and with the exhaust conduits in heat exchange relationship around the compressor parallel to the shaft such that heat from the exhaust gas is transferred to the cool gas.

8. The engine of claim 7 wherein the valved conduit means includes two separate sets of fixed radial position rotatable gears mounted around the shaft on opposite ends of the housing wherein in each set a central gear is mounted around the shaft and outer gears are drivable by intermediate gears which are drivable by the central gear and wherein multiple rotary inlet tubes and multiple outlet tubes each having a longitudinal axis mounted on the housing around the rotors parallel to the longitudinal axis of the shaft with openings in the tubes leading into openings in the housing and the compartments wherein the outer gears are mounted around the tubes to rotate the tubes such that in operation periodically each rotor compartment is provided with a gas under pressure through the inlet tubes, the rotors are rotated by the gas and then the gas exhausted through the outlet tubes.

* * * * *